3,274,148
FRACTURE SUPPORT AGENTS MADE BY CYCLIZING AND CURING RUBBERY PELLETIZED BUTADIENE COPOLYMERS

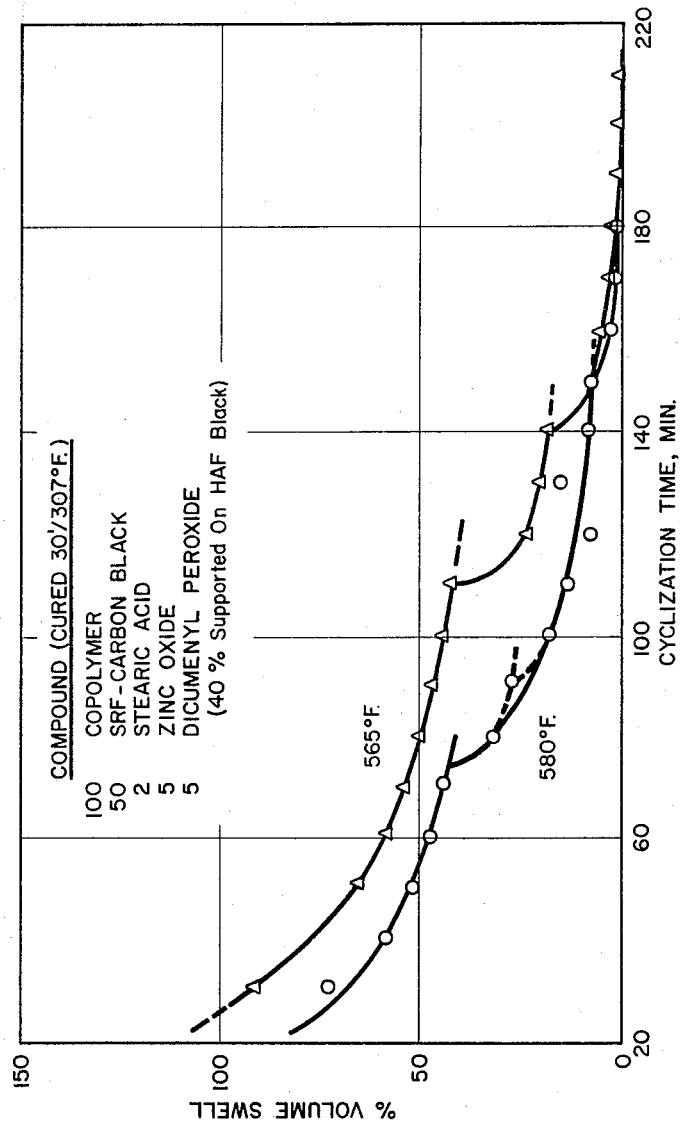

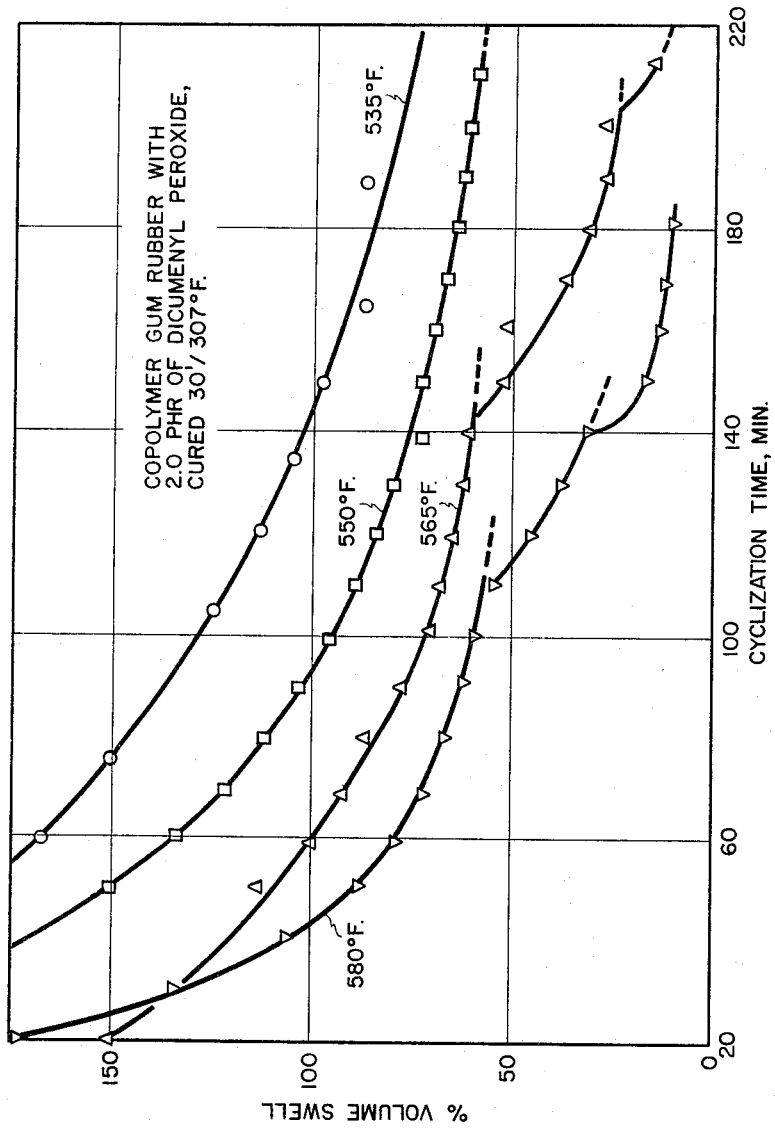

William J. Sparks, Westfield, and Leon S. Minckler, Jr., Metuchen, N.J., assignors to Esso Research and Engineering Company, a corporation of Delaware
Filed May 13, 1964, Ser. No. 367,026
5 Claims. (Cl. 260—41.5)

This invention relates to a continuous process for preparing hard pellets of butadiene-containing polymers for use as propping agents in the hydraulic fracturing of subsurface earth formations and is a continuation-in-part of application, Serial No. 192,009, filed May 2, 1962, now abandoned.

It is known to fracture subsurface earth formations to increase oil production therefrom. This requires the pumping of a fracturing fluid into an oil bearing formation under sufficient pressure to fracture the formation. A fracture support, pumped together with the fluid, remains in the fracture after pressure is released and serves to prop it open. The increased surface area generated results in a corresponding increase in productivity. In many cases the increase in productivity is disappointingly small because fracture support is not realized. All the materials heretofore tried have major deficiencies. Sand is limited in its use to certain types of formations. It will imbed itself in soft formations and will shatter in hard formations and fracture support is thus not realized. Aluminum is not chemically resistant, glass is too hard and others are simply not strong enough.

Experience indicates that it is desirable for fracture supports to be spherical or cylindrical in shape with length equal to diameter, have a size between 0.030 and 0.065 inch and be substantially uniform with 70% of the pellets within 16% of the average length, 97% within 32% of the average length and none having a diameter varying by more or less than 7%. Each individual support must withstand various empiric tests, e.g., the pressure resulting from 30 p.s.i. of air pressure on test equipment with less than 35% flow and preferably less than 30% flow. This corresponds to 16,600 p.s.i. on the pellet at 30% flow or 18,400 at 24% flow. The supports must thus be able to withstand more than 10,000 p.s.i. of compressional force. Any resulting deformation should not significantly decrease the permeability of the supporting system, but should be enough to act as a cushion to prevent damage to the formation. Ten to forty percent deformation is acceptable when the load is applied to the side of the support. The support should not be brittle and shatter under load since this leads to the formation of fines which may reduce permeability.

The diolefin polymers that can be employed as a starting material in the practice of the present invention include the polymers and copolymers of diolefins of four to six carbon atoms. The polymers and copolymers of butadiene are particularly preferred. Any of the diolefins of four to six carbon atoms may be copolymerized with styrene, acrylonitrile, etc. One particularly suitable copolymer is a copolymer of butadiene-1,3 and acrylonitrile. This is a well-known article of commerce, being known as Buna N, ABR, Perbunan and Paracril. It is generally prepared by emulsion polymerization of butadiene with one to 50 wt. percent of acrylonitrile, in accordance with the disclosure of U.S. Patent No. 1,973,000.

Another suitable polymer is the liquid homopolymer of butadiene or copolymer of butadiene with 5 to 40%, preferably 20% styrene, as described in the patent to Jaros, U.S. No. 2,849,510. Since these polymers are liquid they must be mixed with the fillers mentioned below to afford a mixture suitable for pelletizing. Other monomers which may be effectively copolymerized with butadiene include acrylic monomers (methyl methacrylate, acrylic acid, methyl and ethyl acrylate, etc.), vinyl acetate, vinyl chloride, etc. Certain other polymers such as natural rubber, butyl rubber, polyisobutylene, and neoprene cannot be used as starting materials for the purposes of this invention.

The diolefin polymers may be mixed with certain chlorinated polymers such as polyvinyl chloride, polyvinylidene chloride, neoprene, and chlorinated ethylene-propylene rubber. The chlorinated polymer, if used, is present to the extent of 10 to 200 parts per 100 parts of diolefin polymer, preferably 50 to 150 parts.

For ease of injection and economy the supports should be light. A density about that of water, i.e., of one, is ideal.

The support should be resistant to oil, water, acid, caustic and temperatures up to 250° F. and be able to withstand more than 10,000 p.s.i.g. and preferably more than 12,000 p.s.i.g. compressional loads.

In accordance with the present invention it has been discovered that pelletized cyclized diolefin polymers meet the above described properties to the greatest extent.

This invention provides a continuous process for preparing materials of that nature. The process comprises pelletizing diolefin polymers, precuring the pelletized material and cyclizing the pellets by heat treatment under conditions of plug flow. By cyclization is meant the formation of isomeric derivatives of lower unsaturation, apparently by the formation of internal linkages among the double bonds resulting in the formation of rings and connected chains of carbon atoms. (See "Chemistry and Technology of Rubber—ACS Monograph No. 74," by C. Davis and J. Blabe, page 656.)

Various compounding filler additives such as carbon blacks, clays, silica, ground quartz and fluid coke in the range of 5 to 500 phr., preferably 40 to 150 phr., can also be incorporated in the rubber in the conventional manner prior to the pelleting step. Fluid coke is a particularly good filler, yielding pellets having superior compressional strength.

A suitable recipe to be submitted to pelletizing consists of

| | Parts per 100 parts by weight of polymer (phr.) |
|---|---|
| Polymer | 100 |
| Filler | 0 to 500 |
| Plasticizer | 2 to 200 |

Various curing agents in conventional amounts.

The above or similar composition is mixed in any suitable equipment such as on a mixing mill or a Banbury mixer after which it is removed, preferably cooled, extruded and pelleted. A suitable extruder is one fitted with a die containing about 50 holes, 0.035 in. in diameter. Ideally the temperature across the die face should be uniform and not exceed about 260° F. The pelletizing may be accomplished, for example, by means of a 4-blade rotary knife operating at the die face, to give pellets of about 0.043 in. in diameter ($\pm 0.007$ for 70% and $\pm 0.014$ for 97% of the product). To maintain the size of the pellets within this range is difficult and requires constant observation and adjustment of cutter speed, or extrusion rate, amount and temperature of cooling water, etc. This surveillance can be accomplished automatically. A suitable instrument for accomplishing this comprises a photoelectric cell or a sensing or feeling device on the cutting knife which would direct a signal, indicating length, etc., to another control which would monitor the required parameter. For example, a light source, synchronized with the cutter is placed on one side of the die and would impinge on a photoelectric cell placed on the opposite side of the die. The strands of extruded composition would cast a shadow, the amount of which would represent an average length which would be controlled by the output of the photocell, to maintain the desired length by regulating the cutter speed.

The pellets are cured at about 200 to 400° F. for one minute to 17 hours, preferably at 260 to 360° F. for five minutes to one hour with various peroxide or sulfur curing systems. Curing systems and conditions are critical only insofar as they make maintenance of dimensional stability and the hardness required possible. However, the curing step must be carried out under pressure and in the presence of some curing agent. The pressure may be between 50 and 1000 p.s.i.g. The curing step and cyclization step may be combined provided the cyclization is carried out under pressure, in which case no curing agent is necessary.

The curing step, if separate, may be carried out by any method known to the art. For example, the curing may be carried out in the presence of steam, air inert atmosphere, such as nitrogen, flue gases and the like. It may also be carried out in a press or as it is being extruded, or the strand may be cured immediately after extrusion as it passes through a heated, pressurized chamber, followed by pelletizing.

The cured pellets are hardened by cyclizing the rubber by heat treatment at a temperature in the range of about 300 to 650° F. for 24 hours to 5 minutes, preferably 350 to 600° F. for one to three hours. In general the temperature varies inversely with the time and varies within the indicated ranges for different polymers. For example, with butadiene-acrylonitrile copolymers it has been found that the cyclization should not proceed beyond the point where gum rubber has its volume swell in methyl-ethyl ketone reduced below about 55% and filled rubber below a point relatively lower depending on the amount and nature of the filler, but usually between 25 and 50%. Optimum results of 40% volume swell are obtained by cyclization at 565° F. for 110 minutes for the filled composition containing 50 phr. of SRF carbon black. Since filled polymers give harder pellets they are preferred.

It is essential that each individual pellet be heated for no more or no less than the required times. If this is not done then some pellets will be overcured and some undercured. This may be accomplished by heating each individual pellet in a constant temperature bath. However, on a commercial scale, this would not be practical and the same result can be accomplished by maintaining plug flow through the reactor with no back mixing. This may be obtained by the use of a helical screw conveyor passing through a series of heating zones followed by a quenching zone. A rotary reactor designed and operated to give plug flow may also be used as well as a belt or turntable carrying the product through a series of heating zones. In all cases plug flow must be maintained so that all pellets are heated uniformly. Back mixing cannot be tolerated otherwise some pellets will be incompletely cured and other overcured and thus will not have the requisite hardness.

As pointed out above the precuring and cyclization steps may be combined provided the cyclization step be carried out under pressure or under other conditions to prevent the formation of porosity.

The following are set forth as examples of this invention. It is to be understood that the quantities, materials, etc., set forth in these examples are not to limit the scope of the invention thereto.

*Example 1*

A copolymer of butadiene and acrylonitrile containing 35 wt. percent acrylonitrile was compounded according to the following recipe:

| | Parts per 100 parts by weight of copolymer (phr.) |
|---|---|
| Copolymer | 100 |
| SRF carbon black | 50 |
| Stearic acid | 2 |
| Zinc oxide | 5 |
| Dicumyl peroxide (40% supported on HAF carbon black) | 5 |

This composition was blended on a mill, extruded, pelleted and cyclized at atmospheric pressure and a temperature of 565° F., with and without precuring for thirty minutes at 307° F. under a steam pressure of 60 p.s.i.g. The following data were obtained.

TABLE I.—COMPRESSION PROPERTIES OF VARIOUS CYCLIZED NITRILE RUBBER COMPOUNDS

| Runs | 1 | 2 | 3 | 4 | 5 |
|---|---|---|---|---|---|
| | Cyclized in water under press. | | Effect of Precure | | Sulfur [1] Cure |
| Precured 30 min. at 307° F. | No | Yes, no curing agent. | Yes | No | Yes |
| | Compressive Deformation, percent, after Cyclization at 565° F. | | | | |
| Compressive Load, p.s.i.[2] | 9,760 | 8,700 | 8,700 | 9,020 | 10,430 |
| Cyclization Time, Min.: | | | | | |
| 60 | | 51 | 40 | 49 | 27 |
| 70 | | 47 | 35 | 45 | 32 |
| 80 | | 40 | 34 | 45 | 31 |
| 90 | 28 | 42 | 32 | 44 | 28 |
| 100 | | 39 | 26 | 43 | 25 |
| 110 | | 37 | 25 | 52 | 22 |
| 120 | | 38 | 28 | 54 | 24 |
| 130 | | 43 | 26 | 57 | 23 |
| 140 | | | 25 | | |
| 150 | | | 29 | | |

[1] Dicumyl peroxide replaced with 1.0 phr. sulfur and 0.6 phr. tetramethyl thiuram mono sulfide.
[2] Calculated pellet load from 120 p.s.i. equipment pressure.

The above data show that cyclization must be preceded by a precure step unless the cyclization is carried under pressure (compare Runs 1, 3, and 4). Runs No. 2 and 3 show that the separate curing step, if used, must be carried out in the presence of a curing agent, in the instant case, dicumyl peroxide. The compressive deformation of Runs 2 and 4 are greater than those of Runs 1 and 3, because of the formation of porosity, showing the latter products to be superior. Run No. 5 shows that the curing step may take place in the presence of sulfur instead of peroxide with just as good results.

*Example 2*

A copolymer of butadiene and 35 wt. percent acrylonitrile was compounded according to the following recipes.

| Runs | 6 | 7 | 8 |
|---|---|---|---|
| Copolymer, phr | 100 | 100 | 100 |
| SRF carbon black, phr | 50 | 65 | 100 |
| Ketone-diaryl amine, phr | 1 | | |
| Reactive plasticizer,[1] phr | 5 | 15 | 30 |
| Dicumyl peroxide, phr. (40% on HAF) | 2.1 | 2.3 | 2.6 |

[1] Liquid copolymer of 80% butadiene and 20% by weight styrene, prepared by Na polymerization and having a viscosity of 4,000 to 4,500 poise at 100% N.V.M.

This composition was pelletized (.5 in. x 1.0 in.) by partially curing in a mold under pressure for 30 minutes at 307° F. following which the partially cured pellets were cyclized at 565° F. The stress and strain properties of the cyclized pellets yielded the following data:

TABLE II.—COMPRESSION PROPERTIES OF CYCLIZED NITRILE RUBBER
[½ x 1 in. pressed pellets]

| Run No | | 6 | | 7 | | 8 | |
|---|---|---|---|---|---|---|---|
| Hrs. | End Comp. | Yield | Break | Yield | Break | Yield | Break |
| 2.0 | Stress, p.s.i. | 14,000 | 36,000 | 14,000 | 34,000 | 17,000 | 44,000 |
|  | Strain, percent | 6 | 45 | 6 | 41 | 6 | 41 |
| 2.83 | Stress, p.s.i. | 15,000 | 40,000 | 16,000 | 43,000 | 17,000 | 42,000 |
|  | Strain, percent | 6 | 45 | 7 | 44 | 6 | 39 |
| 3.0 | Stress, p.s.i. | 16,000 | 40,000 | 17,000 | 36,000 | 18,000 | 40,000 |
|  | Strain, percent | 7 | 40 | 8 | 38 | 8 | 35 |
| 3.67 | Stress, p.s.i. | 17,000 | 33,000 | 17,000 | 35,000 | 19,000 | 40,000 |
|  | Strain, percent | 8 | 34 | 8 | 35 | 7 | 33 |
|  | Side Comp. |  |  |  |  |  |  |
| 2.0 | Stress, p.s.i. |  | 11,000 |  | 9,400 |  | 6,900 |
|  | Strain, percent |  | 36 |  | 35 |  | 14 |
| 2.33 | Stress, p.s.i. |  | 7,400 |  |  |  |  |
|  | Strain, percent |  |  |  |  |  |  |
| 3.0 | Stress, p.s.i. |  | 7,400 |  | 7,000 |  | 7,200 |
|  | Strain, percent |  | 18 |  | 13 |  | 11 |
| 3.67 | Stress, p.s.i. |  | 7,800 |  | 7,400 |  | 4,600 |
|  | Strain, percent |  | 13 |  | 12 |  | 7 |

*Example 3*

A copolymer of butadiene and 35 wt. percent acrylonitrile was compounded according to the following recipe:

| Runs | 9 | 10 | 11 |
|---|---|---|---|
| Copolymer | 100 | 100 | 100 |
| SRF carbon black | 50 | 60 | 100 |
| Stearic acid | 1 | 1 | 1 |
| Ketone-diaryl amine, phr | 1 | 1 | 1 |
| Plasticizer [1] | 5 | 15 | 30 |
| Dicumyl peroxide (40% on HAF black) | 3 | 3 | 3 |

[1] Liquid copolymer of 80% butadiene and 20% by weight styrene, prepared by Na polymerization and having a viscosity of 4,000 to 4,500 poise at 100% N.V.M.

This composition was pelletized and cured for thirty minutes at 307° F. under steam pressure of 60 p.s.i.g. and then cyclized at 565° F. in a constant temperature bath. The percent compressive deformation of the cyclized pellets was then determined yielding the following data.

TABLE III

| Cyclization Time, Hrs. | Compressive Deformation, percent, after Cyclization at 565° F. | | |
|---|---|---|---|
|  | 9 | 10 | 11 |
| 2.0 | 18 | 8 | 23 |
|  | 31 | 27 | 38 |
|  | 40 | 36 | 46 |
|  | 46 | 43 | 53 |
| 2.5 | 4 | 8 | 11 |
|  | 19 | 25 | 31 |
|  | 28 | 34 | 42 |
|  | 37 | 50 | 50 |
| 3.0 | 9 | 6 | 5 |
|  | 27 | 21 |  |
|  | 32 | 32 |  |
|  | 39 | 40 |  |
| 3.5 | 4 | 5 | 3 |
|  | 13 | 18 | 12 |
|  | 26 | 29 | 17 |
|  | 33 | 38 | 23 |

*Example 4*

A rubbery copolymer of 75% by weight of butadiene and 25% styrene prepared by emulsion polymerization was compounded according to the following recipe.

| Run No | 12 | 13 |
|---|---|---|
| Copolymer, phr | 100 | 100 |
| SRF carbon black, phr | 50 | 100 |
| Reactive plasticizer [1] phr | 10 | 30 |
| Dicumyl peroxide (40% on HAF) carbon black | 2.75 | 3.25 |

[1] A liquid copolymer of butadiene and styrene prepared with Na as catalyst and having a viscosity of 4,000 to 4,500 poise at 100% N.V.M.

This recipe was pelletized and press cured for thirty minutes at 307° F. The cured pellets were then cyclized at 565° F. and the stress-strain properties of the product determined with the following results:

TABLE IV.—COMPRESSION PROPERTIES OF CYCLIZED SBR

| Run No | | 12 | | 13 | |
|---|---|---|---|---|---|
| Time, Hrs. | End Compression | Yield | Break | Yield | Break |
| 2.0 | Stress, p.s.i. |  | 14,000 |  | 36,000 |
|  | Strain, percent |  | 50 |  | 50 |
| 3.0 | Stress, p.s.i. |  | 37,000 | 7,200 | 37,000 |
|  | Strain, percent |  | 50 | 4 | 43 |
| 4.0 | Stress, p.s.i. | 6,800 | 36,000 | 12,000 | 37,000 |
|  | Strain, percent | 5 | 50 | 5 | 39 |
| 5.0 | Stress, p.s.i. | 9,600 | 41,000 | 13,000 | 38,000 |
|  | Strain, percent | 5 | 50 | 5 | 37 |
| 6.0 | Stress, p.s.i. | 11,000 | 35,000 | 14,000 | 33,000 |
|  | Strain, percent | 9 | 46 | 6 | 32 |
|  | Side Compression |  |  |  |  |
| 2.0 | Stress, p.s.i. |  | 12,000 |  | 17,000 |
|  | Strain, percent |  | 50 |  | 50 |
| 3.0 | Stress, p.s.i. | 1,500 | 15,000 | 3,700 | 17,000 |
|  | Strain, percent | 8 | 50 | 10 | 50 |
| 4.0 | Stress, p.s.i. | 3,300 | 17,000 | 4,700 | 12,000 |
|  | Strain, percent | 9 | 50 | 9 | 38 |
| 5.0 | Stress, p.s.i. | 4,100 | 21,000 | 5,700 | 11,000 |
|  | Strain, percent | 9 | 50 | 10 | 33 |
| 6.0 | Stress, p.s.i. | 4,900 | 19,000 | 6,100 | 8,800 |
|  | Strain, percent | 10 | 50 | 11 | 19 |

*Example 5*

A rubbery butadiene homopolymer prepared by emulsion polymerization was compounded according to the following recipes:

| Run No | 14 | 15 |
|---|---|---|
| Polymer, phr | 100 | 100 |
| SRF Carbon black | 65 | 100 |
| Reactive plasticizer [1] | 15 | 30 |
| Dicumyl peroxide (40% on HAF) | 2.88 | 3.25 |

[1] A liquid polymer of butadiene prepared with sodium as catalyst.

The compositions were each pelletized, press cured for thirty minutes at 307° F. and cyclized at 565° F. The stress and strain properties of the cyclized product were determined with the following results.

TABLE V.—COMPRESSION PROPERTIES OF CYCLIZED POLYBUTADIENE

| Run No. | | 14 | | 15 | |
|---|---|---|---|---|---|
| Hrs. | End Comp. | Yield | Break | Yield | Break |
| 2.0 | Stress, p.s.i. | 4,000 | 44,000 | 6,200 | 44,000 |
|  | Strain, percent | 5 | 48 | 5 | 41 |
| 2.5 | Stress, p.s.i. | 6,000 | 47,000 | 8,400 | 45,000 |
|  | Strain, percent | 6 | 46 | 5 | 39 |
| 3.0 | Stress, p.s.i. | 7,500 | 49,000 | 10,000 | 46,000 |
|  | Strain, percent | 5 | 41 | 6 | 37 |
| 3.5 | Stress, p.s.i. | 8,900 | 49,000 | 11,000 | 46,000 |
|  | Strain, percent | 6 | 42 | 7 | 36 |
|  | Side Comp. |  |  |  |  |
| 2.0 | Stress, p.s.i. | 7,200 | 18,000 | 7,800 | 14,000 |
|  | Strain, percent | 27 | 50 | 39 |  |
| 2.5 | Stress, p.s.i. | 6,900 | 16,000 | 8,000 | 12,000 |
|  | Strain, percent | 25 | 47 | 22 | 36 |
| 3.0 | Stress, p.s.i. | 7,000 | 13,000 |  | 7,400 |
|  | Strain, percent | 22 | 41 |  | 17 |
| 3.5 | Stress, p.s.i. | 4,900 | 7,000 |  | 7,500 |
|  | Strain, percent | 13 | 24 |  | 17 |

*Example 6*

A rubbery copolymer of butadiene and 35% by weight of acrylonitrile was compounded according to the following recipes:

| Run No. | 16 | 17 |
|---|---|---|
| Copolymer | 100 | 100 |
| SRF Carbon black | 50 | 0 |
| Stearic acid | 2 | 0 |
| ZnO | 5 | 0 |
| Dicumyl peroxide (40% on HAF) | 5 | 0 |
| Dicumyl peroxide | 0 | 2 |

Each of these recipes were pelletized, cured at 307° F. for thirty minutes and cyclized at various temperatures for up to 220 minutes. Samples were taken periodically and the volume percent swell in methyl ethyl ketone after 70 hours was determined. The results are reported in FIGURES 1 and 2. The results show that the rate of cyclization increases rapidly with increasing temperature, the filled compound having the higher apparent cross-link density. A significant feature of the two curves is the break that appears at about 55% volume swell for gum rubber and about 40% for carbon black filled compounds. This is an indication of a second, faster reaction and represents the area found to give maximum compressional strength. The portion of the curve below the break represents a product which is hard and brittle. Thus, filled rubber of this composition should be cyclized until the volume swell is reduced to 40% while gum rubber is cyclized until it reaches 55% volume swell. The optimum volume swell may vary between about 25 and 50% depending on composition. Lesser breaks occur in these curves at lower values as well.

*Example 7*

Rubbery copolymers of butadiene and 35 wt. percent of acrylonitrile and 75% butadiene and 25 wt. percent styrene were compounded according to the following recipes:

TABLE VI.—PHYSICAL PROPERTIES OF COKE FILLED MATERIALS

| Run Nos. | 18 | 19 | 20 | 21 | 22 | 23 |
|---|---|---|---|---|---|---|
| Compound: |  |  |  |  |  |  |
| Butadiene-acrylonitrile | 100 | 100 | 100 | 100 |  |  |
| Butadiene-styrene |  |  |  |  | 100 | 100 |
| SRF carbon black | 50 |  |  |  | 50 |  |
| Fluid coke: |  |  |  |  |  |  |
| Ball-milled 4 Hrs. |  | 50 |  |  |  | 50 |
| Ball-milled 8 Hrs. |  |  | 50 |  |  |  |
| Ball-milled 20 Hrs. |  |  |  | 50 |  |  |
| Stearic acid | 2 | 2 | 2 | 2 | 2 | 2 |
| Zinc oxide | 5 | 5 | 5 | 5 | 5 | 5 |
| Dicumyl peroxide (40% on HAF) | 5 | 5 | 5 | 5 | 5 | 5 |

The compounds were pelletized and cured for thirty minutes at 307° F. The cured pellets were then heat treated at 565° F. and the stress-strain properties determined. The following data were obtained:

TABLE VII.—COMPRESSIONAL PROPERTIES OF CYLINDRICAL PELLETS ON THEIR SIDES

| Run Nos. | 18 | 19 | 20 | 21 | 22 | 23 |
|---|---|---|---|---|---|---|
| Pellet Diameter, in | .098 | .081 | .100 | .087 | .094 | .090 |
| Cyclized at 565° F.: |  |  |  |  |  |  |
| Stress, p.s.i.[1] | 12,500 | 18,300 | 12,000 | 15,900 | 13,600 | 14,800 |
| Strain [2] (after cyclization for various lengths of time): |  |  |  |  |  |  |
| 60 min | 37 | 34 | 50 | 49 |  |  |
| 90 min | 27 | 24 | 40 | 45 | 44 | 45 |
| 120 min | 23 | 21 | 31 | 42 | 43 | 42 |
| 180 min |  |  |  |  | 33 | 35 |

[1] Determined from pellet dimensions at maximum load of the equipment used.
[2] Percent compressive deformation after cyclization at stated time.

The above data show that the best properties are obtained from a fluid coke ball-milled for four hours (Run No. 19) and are even better than ordinary carbon black.

*Example 8*

A copolymer of butadiene and 35% by weight of acrylonitrile was compounded according to the following recipe:

| Run Nos. | 24 | 25 | 26 | 27 |
|---|---|---|---|---|
| Copolymer | 100 | 100 | 100 | 100 |
| Carbon black, SRF | 50 | 50 | 65 | 100 |
| Reactive plasticizer [1] |  | 5 | 15 | 30 |
| Dicumyl Peroxide (40% on HAF) | 2.5 | 2.63 | 2.88 | 3.25 |

[1] Liquid copolymer of butadiene and styrene having a viscosity of 4,000 to 4,500 at 100% N.V.M. and prepared with sodium as catalyst (U.S. Patent No. 2,849,510).

The compound was extruded through a 50 hole die (0.034 inch) of 2 in. twin screw extruder (max. temp. 266° F.).

| Run No. | 24 | 25 | 26 | 27 |
|---|---|---|---|---|
| Processing Properties: | | | | |
| Mooney, 8'/212° F. | 65 | 55 | 44 | 30 |
| Extrusion: | | | | |
| Rate, lbs./hr. | 80 | 100 | | 190 |
| Swell, diameter, percent | 85 | 68 | 68 | 29 |
| Surface | (1) | (2) | (3) | (4) |

[1] V. rough.
[2] Rough.
[3] Sl. rough.
[4] Smooth.

The pellets were then precured for 30 minutes at 307° F. and cyclized under nitrogen at 565° F. with the following results:

| Run No. | 24 | 25 | 26 | 27 |
|---|---|---|---|---|
| Physical Properties 140 Min. Cyclization: | | | | |
| Yield, Stress, p.s.i. | 14,600 | 15,200 | 15,800 | 16,900 |
| Strain, percent | 6.2 | 6.2 | 7.0 | 6.2 |
| Break, Stress, p.s.i. | 39,700 | 40,000 | 42,700 | 41,800 |
| Strain, percent | 44.2 | 45.5 | 44.1 | 38.1 |
| Elastic Mod.×10⁻³ p.s.i. | 384 | 392 | 412 | 414 |

| Run No. | 24 | 25 | 26 | 27 |
|---|---|---|---|---|
| Maximum Properties: | | | | |
| Yield, Stress, p.s.i. | 17,400 | 17,200 | 17,500 | 18,800 |
| Strain, percent | 7.8 | 7.7 | 7.8 | 7.7 |
| Time, min. | 220 | 200 | 220 | 200 |
| Break, Stress, p.s.i. | 39,700 | 41,000 | 42,770 | 44,000 |
| Strain, percent | 44.4 | 44.5 | 44.1 | 41.7 |
| Time, min. | 140 | 160 | 140 | 120 |
| Elastic, Mod.×10⁻³ p.s.i. | 384 | 392 | 412 | 440 |

The above data show that the addition of a liquid copolymer of butadiene and styrene lowers the Mooney viscosity, more than doubles the extrusion rate, reduces swell markedly, and improves the appearance of the extrudate. In addition, it makes possible higher loading and results in an improved cyclized product.

*Example 9*

A liquid copolymer of 80% butadiene and 20 wt. percent styrene prepared by sodium polymerization and having a viscosity at 100% NVM of 4,000–4,500 was mixed with a rubbery copolymer of 75% butadiene and 25 wt. percent styrene prepared by emulsion polymerization and compounded according to the following recipe:

| | Parts by weight |
|---|---|
| Liquid copolymer | 60 |
| Rubbery copolymer | 40 |
| Ethylene dimethacrylate | 5 |
| Methyl ethyl ketone peroxide | 6 |
| Ethylene dimethacrylate | 3 |
| Polymerized trimethyl-dihydroquinoline | 0.4 |
| Ca stearate | 1.0 |
| Fluid coke | 375.0 |

The compounded mixture was extruded and pelletized with ease through a 50 hole die (holes 0.034 in. dia.) by a 2 in. twin screw extruder. The pellets were cured under steam for 30 minutes at 307° F. and cyclized for three and four hours at 565° F. Both of these samples withstood compressional stress on their sides of up to 14,550 p.s.i.g., with only 1% deformation.

*Example 10*

A rubbery copolymer of butadiene and 35 wt. percent of acrylonitrile was compounded according to the following recipe:

| | Phr. |
|---|---|
| Copolymer | 100 |
| SRF carbon black | 50 |
| Stearic acid | 2 |
| ZnO | 5 |
| Dicumyl peroxide (40% on HAF) | 5 |

The compound mixture was extruded and pelletized as in Example 8 but admixed with reclaimed material (previously cyclized) in which the reclaim is (a) ground and mixed with new stock simultaneously on the mill, (b) ground on a mill and then mixed, (c) and ball milled before mixing as shown in the following table, together with the physical properties of the cyclized products.

TABLE VIII.—PROPERTIES OF COMPOUNDS UTILIZING RECLAIM

| Compound [1] | A | B | C |
|---|---|---|---|
| New Stock [1] | 100 | 100 | 100 |
| Reclaim (ground) | 100 | | |
| Milled | | 100 | |
| Ball-Milled (6 hrs.) | | | 100 |
| Compression Properties of 0.08 Inch Cyclized Pellets on Their Sides: | | | |
| Stress, p.s.i. | 18,800 | 18,800 | 18,800 |
| Strain, percent (Cyclized at 565° F. for various times): | | | |
| 60 min. | 43 | 37 | 32 |
| 90 min. | 37 | 35 | 31 |

[1] The new stock, as well as the cyclized material, was prepared from the formulation:

| | Phr. |
|---|---|
| Copolymer | 100 |
| SRF carbon black | 50 |
| Stearic acid | 2 |
| Zinc oxide | 5 |
| Dicumyl peroxide (40% on HAF carbon black) | 5 |

The above data show that the mixing of reclaim with new stock yields acceptable cyclized pellets, with the ball-milled product giving best results.

*Example 11*

A rubbery copolymer of butadiene and 25% styrene prepared by emulsion polymerization was compounded according to the following recipe:

| | Phr. |
|---|---|
| Copolymer | 100 |
| SRF carbon black | 50 |
| Stearic acid | 1 |
| ZnO | 5 |
| Sulfur | 0.5 |
| Tetramethyl thiuram disulfide | 1.5 |
| Tetraethyl thiuram disulfide | 1.5 |
| Benzothiazyl disulfide | 1.0 |

This composition was milled, extruded and pelletized and cured at 307° F. for thirty minutes. The percent compressive deformation after cyclizing the cured pellets at 565° F. is shown in the following table.

TABLE IX.—COMPRESSIVE DEFORMATION, PERCENT. AFTER CYCLIZATION AT 565° F.

| Compressive load, p.s.i. | 11,430 |
|---|---|
| Cyclization time, min.: | |
| 60 | 61 |
| 90 | -- |
| 120 | 55 |
| 150 | 46 |
| 180 | 41 |
| 210 | 38 |
| 240 | -- |
| 270 | 35 |
| 300 | 31 |
| 330 | 34 |
| 360 | 31 |

These data when read with other examples given show that sulfur cure is just as effective as peroxide cure.

*Example 12*

A copolymer of butadiene and acrylonitrile containing 35% acrylonitrile was compounded according to the following recipe:

| Compound | D | E | F |
|---|---|---|---|
| Copolymer | 100 | 100 | 100 |
| Finely divided SiO$_2$ | 50 | 40 | |
| TiO$_2$ | 5 | 5 | |
| SRF carbon black | | | 40 |
| Stearic acid | 1 | 1 | 1 |
| Zinc oxide | 5 | 5 | 5 |
| 2,6, ditertiary butyl, 4-methyl phenol | 1 | 1 | |
| Aminox, reaction product of diphenylamine and acetone | | | 1 |
| Dibasic lead phosphite | | 5 | 5 |
| Polyvinyl chloride | | 100 | 100 |
| Dicumyl peroxide (40%) | 5 | 7 | 7 |
| Polyester | | 15 | 15 |
| Diallyl phthalate | | 10 | 10 |

This composition was blended on a mill, extruded, pelleted and cyclized at atmospheric pressure after precuring for thirty minutes at 307° F. under a pressure of 60 p.s.i.g. The following data were obtained.

| Compound | D | E | F |
|---|---|---|---|
| Cyclization Temp., ° F. (after 30′ cure at 307° F.) | 565 | 400 | 400 |
| Stress, p.s.i. | 14,800 | 14,800 | 14,800 |
| Strain, Percent (cyclized for various times): | | | |
| 40 min | 45 | 27 | 31 |
| 50 min | 39 | 24 | 24 |
| 60 min | 39 | 22 | 24 |
| 150 min | 22 | | |

The above data show that compounds E and F containing polyvinyl chloride heat cyclize and harden much faster and at lower temperatures than compound D which does not contain polyvinyl chloride. The strain of compounds E and F after cyclizing at 400° F. for sixty minutes is substantially the same as that of compound D which was cyclized at 565° F. for 150 minutes.

From the above examples it is clear that this invention affords a method of preparing pellets which are capable of withstanding compressional forces of over 10,000 p.s.i.g. and are thus suitable for use as fracture supports.

In employing the pelletizing rubber in fracturing operations, the pellets are suitably added to a fracturing liquid which may be a hydrocarbon or may be an aqueous fracturing liquid, such as fresh or salt water. Other fracturing liquid such as oil-in-water emulsions, water-in-oil, oil-in-acid emulsions, acidic fluids, and the like, may be used. As a general statement, the fracturing liquids which are known to the art may be employed in the practice of the present invention and may suitably contain various materials for controlling the viscosity and/or fluid loss thereof. The fracturing liquid may contain pellets in an amount within the range from about 0.10 to about 5.0 pounds of the pellets per gallon of liquid whether it be an oily or an aqueous liquid. It may be desirable under some circumstances to add materials to the liquid vehicle in which the pellets are suspended which will maintain the pellets as a suspension therein.

In practicing the present invention, a subsurface earth formation penetrated by a well may have a suspension of the pellets introduced as a suspension thereinto under pressure against an exposed formation, following which the pressure on the suspension is increased until the breakdown pressure of the formation is achieved which causes fractures, either vertical or horizontal, to extend out from the well bore. The formation of fractures may be indicated by a drop in pump pressure and/or an increase in pump rate. Upon parting the formation, the carrier fluid containing the pelletized propping agent is injected into the extending fracture and, when injection is stopped, the solid pellets maintain the fracture open. Thereafter, the well is placed on production by providing a pressure differential from the formation into the well which is suitably achieved by swabbing or by replacing the liquid in the well with a lighter liquid. The fracturing liquid is flushed back into the well ahead of hydrocarbons produced in the well and thus removed therefrom.

The present invention may be practiced by hydraulically fracturing the formation pierced by the well using a fracturing liquid, following which a liquid suspension of the pellets in an aqueous or oily vehicle may be introduced into the well in contact with the fractured formation, following which sufficient pressure is applied to force the suspension into the formation to lodge the pellets in the fractures and maintain them open. Thus, the formation may be fractured with a fracturing liquid such as an oily or aqueous vehicle, an acid gel, or an emulsion, and when a fracture is indicated by a drop in pressure, the liquid suspension is immediately forced into the fractured formation under a sufficiently high pressure to maintain the fractures open. In short, the fracturing liquid may be followed by the liquid suspension of the pellets, although the fracturing may be initially performed with the suspension.

The pellets employed in propping the fractures open have unique properties in that the pellets do not crush or shatter when subjected to pressures such as existing in fractures in an earth formation in which the pellets are lodged. Heretofore, in fracturing subsurface earth formations, it has been the practice to employ granular materials such as sand, nut shells, nut hulls, as well as metallic spherals, such as aluminum spherals, to prop the fractures open. Sand is a rigid material such that, on reaching its load limit, it shatters completely, leaving virtually no fracture width, and also its crushing results in a large quantity of fine particles which reduce greatly the ability of the remaining fracture, if any, to conduct fluid. Nut hulls such as walnut hulls break into particles and also produce fines. Aluminum spheres are expensive and have the further disadvantage of being readily attacked by acid or caustic solutions used in well treating operations. Additionally, aluminum spheres may allow the establishment of a galvanic cell (aluminum-electrolyte-steel). These latter disadvantages are aggravated by high well temperatures. The pellets employed in the present invention deform without crushing but, on deformation, the area of contact thereof is increased which is beneficial in maintaining fractures open. The pellets are lightweight and are of controllable density which allows large pellets to be carried into the fractures readily. Moreover, the pellets are not attacked by well fluids, including hydrocarbons, acid, or caustic.

The pellets, whether used in the form of spherical, cylindrical, or irregularly shaped pellets, may be easily handled in a wet or dry condition. Thus, the pellets may be bagged and transported to the well site and then introduced into fracturing liquid, whether it be an oily or aqueous vehicle. Thus, the pellets may be introduced into the pump liquid through a hopper and the pump liquid thus formed into a suspension and then introduced into the well through a tubing or casing-tubing annulus and thence into a sub-surface earth formation pierced by the well, either through perforations in the well casing or in an open hole below the casing. Under some circumstances it may be desirable, when the suspension is introduced through the tubing, to confine the area which is to be fractured by employing a packer closing the casing-tubing annulus.

The amount of pressure employed in fracturing operations is well known and is easily determinable from the type of formation and the depth thereof in the well.

It is to be emphasized in the practice of the present invention that the cured and cyclized butadiene polymer is not employed as a coating. The cured and cyclized polymer is employed to form pellets which are used as a propping agent in fracturing operations. The properties of the pellets are governed by the properties of the cyclized polymer. The filler controls the density of the pellet. The filler which is used in amounts of about 40 to about 100 parts per 100 parts of cyclized rubber is a fine powder having a size from about 50 Angstroms to about 100 mesh and is uniformly dispersed in the polymer so that the finished pellet is comprised of rubber primarily with finely divided particles dispersed in the polymer. An advantage of the use of fillers is the control of pellet density. The cyclized polymer has a density of about 1.0 to about 1.3 and may range from about 1.0 to 1.2, as compared to the density of sand which is about 2.65 grams per cc. Thus, using a filler of low density results in a pellet which is quite light. A pellet having a density from about 1.0 to about 1.6 may be provided. Even higher densities may be obtained by using large amounts of heavy fillers, such as silica. A low density pellet is of substantial advantage when it is necessary or desirable to fracture formations at low rates with low viscosity fracturing liquids. Likewise, if high density pellets are needed, the desired density may be obtained by employing high density fillers. In short, the employment of fillers is optional, and pellets of controlled hardness, strength, density and malleability are provided.

The nature of the present invention having been thus fully set forth, what is claimed as new and useful and desired to be secured by Letters Patent is:

1. A continuous method for preparing hard pelletized fracture supports which comprises:
   continuously passing a polymer of conjugated diolefin through a plurality of treating zones comprising the following successive steps:
   (a) pelletizing said polymer,
   (b) effecting partial cure of said pelletized polymer under pressure in the presence of a curing agent at a temperature between 200 and 400° F. and a pressure between 20 and 1000 p.s.i.g. for a period of time between one minute and 17 hours,
   (c) effecting cyclization of said partially cured pellets by passing said partially cured pellets through a heating zone under conditions of substantially plug flow at a temperature between 300 and 650° F. and a pressure between atmospheric and 1000 p.s.i.g. for a period of time between 5 minutes and 24 hours.

2. The process of claim 1 in which the polymer is a rubbery copolymer of butadiene-1,3 and 1 to 50 wt. percent acrylonitrile, containing 5 to 500 parts by weight, per hundred parts of copolymer of filler.

3. The process of claim 2 in which the polymer is a homopolymer of butadiene, containing 5 to 500 parts by weight, per hundred parts of copolymer, of filler.

4. The process of claim 2 in which the polymer is a copolymer of 75 wt. percent of butadiene and 25% styrene, containing 5 to 500 parts by weight, per hundred parts of copolymer, of filler.

5. The process of claim 2 in which the polymer is a mixture of one hundred parts by weight of a polymer of conjugated diolefin and 10 to 200 parts by weight of a chlorinated polymer chosen from the group consisting of polyvinyl chloride, polyvinylidene chloride, neoprene, and chlorinated ethylene-propylene rubber, containing 5 to 500 parts by weight, per hundred parts of copolymer, of filler.

References Cited by the Examiner

UNITED STATES PATENTS

| | | | |
|---|---|---|---|
| 2,459,745 | 1/1949 | Waters | 260—767 |
| 2,625,523 | 1/1953 | Garber et al. | 260—890 |
| 2,906,740 | 9/1959 | Becker et al. | 260—79.5 |
| 2,953,763 | 5/1960 | Newman et al. | 260—890 |

SAMUEL H. BLECH, *Primary Examiner.*

P. LIEBERMAN, *Assistant Examiner.*